United States Patent
Hossner

Patent Number: 5,631,928
Date of Patent: May 20, 1997

[54] ENHANCED B3ZS DECODER AND METHOD FOR IDENTIFYING TRUE ZERO-SUBSTITUTIONS

[75] Inventor: Steven E. Hossner, Hillsboro, Oreg.

[73] Assignee: NEC America, Inc., Melville, N.Y.

[21] Appl. No.: 451,212

[22] Filed: May 26, 1995

[51] Int. Cl.⁶ .................................................. H04L 25/34
[52] U.S. Cl. .......................................... 375/289; 371/57.1
[58] Field of Search ........................ 375/289; 371/57.1; 341/55, 56, 57, 73; 370/55

[56] References Cited

U.S. PATENT DOCUMENTS

| | | | |
|---|---|---|---|
| 3,787,613 | 1/1974 | Farmer et al. | 178/2 R |
| 4,503,546 | 3/1985 | Yoshine et al. | 341/73 |
| 4,581,741 | 4/1986 | Huffman et al. | 371/67 |
| 4,745,601 | 5/1988 | Diaz et al. | 370/110.1 |
| 4,750,179 | 6/1988 | Davidow et al. | 371/57 |
| 4,785,466 | 11/1988 | Lee et al. | 375/17 |
| 4,799,217 | 1/1989 | Fang | 370/68.1 |
| 4,885,582 | 12/1989 | LaBarge et al. | 341/57 |
| 4,887,083 | 12/1989 | Kosugi et al. | 341/56 |
| 5,191,595 | 3/1993 | Parsons | 375/3.1 |
| 5,193,087 | 3/1993 | Lichtash et al. | 370/58.2 |
| 5,394,145 | 2/1995 | Gupta et al. | 341/73 |
| 5,504,761 | 4/1996 | Shimbashi et al. | 371/57.2 |

Primary Examiner—Stephen Chin
Assistant Examiner—Kevin Kim
Attorney, Agent, or Firm—Sughrue, Mion, Zinn, Macpeak & Seas

[57] ABSTRACT

An enhanced B3ZS decoder which substantially improves error-multiplication performance is disclosed. A string of four bits is examined to detect whether it satisfies two specific criteria. The first criterion is that every valid zero-substitution pattern is immediately preceded by a "one" bit. The second criterion is that successive zero-substitution BPVs are of opposite polarity. When these criteria are met, the appropriate bits are set to zero, effectively replacing the identified pattern with the original three-zero pattern.

12 Claims, 2 Drawing Sheets

TRANSMITTED 0 1 2 3

RECEIVED 0 1 2 3

| | TRANSMITTED | RECEIVED |
|---|---|---|
| FIG. 1a | 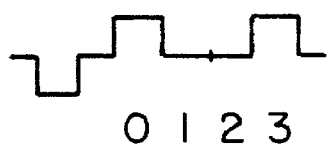 | 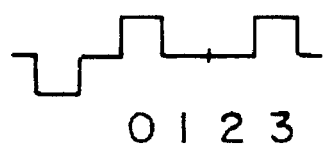 |
| | 0 1 2 3 | 0 1 2 3 |
| FIG. 1b | | |
| | 0 1 2 3 | 0 1 2 3 |
| FIG. 1c | | |
| | 0 1 2 3 | 0 1 2 3 |
| FIG. 1d | | |
| | 0 1 2 3 | 0 1 2 3 |

ENHANCED B3ZS DECODER AND METHOD FOR IDENTIFYING TRUE ZERO-SUBSTITUTIONS

BACKGROUND OF THE INVENTION

1. Field of the Invention

The present invention relates generally to bi-polar data decoding/encoding and, more particularly, to a B3ZS decoder which is capable of identifying true zero-substitution patterns and recognizing certain corrupted zero substitution patterns.

2. Description of Related Art

Bipolar coding is a form of ternary coding in which a binary signal is encoded by alternating the sense (positive/negative) of the logical "ones" of the binary signal. Thus binary "zero" bits are represented as the absence of a pulse, but binary "one" bits are represented by either positive or negative pulses (e.g., +/–3 Volts), the polarity being changed at every successive occurrence of a "one" bit. Since the coding only changes the polarity of logic ones, signalling rate remains unchanged.

The alternation of polarity provides a simple way of in-service performance monitoring. That is, since the polarity of the "ones" is alternated at each consecutive "one" bit, any isolated error, whether deletion or addition of a pulse, causes a violation of the alternating polarity. Such a violation is called a bipolar violation (BPV). Therefore, a monitoring system can detect an error whenever two consecutive "ones" have the same polarity (e.g., two consecutive +3 volts).

In addition to communicating the data, the received signal is also used by the receiving station to generate a clock signal for synchronization. The received signal is sent to a clock circuit which generates clock pulses by sensing the signal's level changes. However, since the clock signal is generated based on level changes, its accuracy may be effected when the received signal contains a long string of zeros.

In order to avoid transmission of strings of zeros, line coding methods are used which replace long strings of zeros with a sequence of symbols forming a substituted word. One such family of codes is known as bipolar with N-zero substitution (BNZS). For example, the B6ZS code allows strings of up to five zeros, but replaces strings of six zeros with a specific word. The definitions of various BNZS codes can be found in ANSI® T1.102-1993, Revision of ANSI® T1.102-1987.

A fundamental requirement for the substituted word is that it must have some characteristic which allows it to be easily and reliably identified, so that it can eventually be removed and replaced by the original string of zeros. The characteristic property used in BNZS coding is the occurrence of multiple BPVs. That is, the strings of zeros is replaced with a word which induces several BPVs. Since the probability of occurrence of more than one BPV in a block of N pulses is small, when such a multiple violation is detected, it may be safely assumed to be a substitution sequence by the BNZS decoder and the word can be replaced with the appropriate string of zeros.

The B8ZS line coding is currently used, for example, for DS1 and DS1C telecommunication channels, and the B6ZS for DS2 telecommunication channels. The B6ZS replaces a string of six zeros with a word which creates multiple BPVs, but allows strings of up to five zeros. Similarly, the B8ZS replaces a string of eight zeros with a word which creates multiple BPVs, but allows strings of up to seven zeros. However, in time synchronization sensitive systems, strings of five zeros may be problematic. Therefore, for such systems it is preferable to use a B3ZS coding. That is, to ensure accurate synchronization, no more than two consecutive zeros are allowed in such systems.

Although the B3ZS provides higher density of 1's by allowing strings of no more than two zeros, it does not support multiple BPVs in a single replacement word. That is, the string of three zeros is replaced by a word which induces only one violation. Thus, typical B3ZS decoders identify three-zero-substitution patterns by detecting the occurrence of any single BPV, regardless of their context. For example, the RC-28D B3ZS decoder designed by NEC-Japan searches for xxV and substitutes 0x0 (x being either a one or a zero and V being a logical one of the same polarity as the previous logical one). The Wandell & Goltermann design (WG-PF5) searches for x0V and substitutes 000 (Wandell & Goltermann, Description and Operating Manual, PF-5, BN2110, Edition 4021/11.90).

In error-free environments, reliance on a single BPV presents no problem, as every occurrence of a BPV is used as the indication of a substitution pattern. In real environments, however, where errors occur with a statistical probability that is non-zero, error-multiplication results, where the number of errors leaving the B3ZS decoder is greater than the number of errors it receives. As stated above, any isolated error, whether addition or deletion of a "one" bit, causes a BPV. Accordingly, the above-mentioned B3ZS decoders will identify the BPV associated with the isolated error as an indication of a substitution pattern and will substitute two or three zeros. Consequentially, downstream equipment receive a degraded signal. Moreover, downstream circuits that must synchronize on the decoded signal (e.g., demultiplexers, VMRs) can lose synchronization sooner and take longer to resynchronize, disrupting communication channels for longer periods of time.

SUMMARY OF THE INVENTION

The enhanced B3ZS decoder and method of the present invention provides a more accurate detection of true and corrupted zero-substitutions, to allow the system to ignore certain error-related BPVs. Thus the enhanced B3ZS decoder and method of the present invention is capable of restoring corrupted zero substitutions and minimizes erroneous substitution of zeros for certain error-related BPVs.

According to an embodiment of the invention, a string of four bits is examined to detect whether it satisfies two specific criteria. When these criteria are met, the appropriate bits are set to zero, effectively replacing the identified pattern with the original three-zero pattern. The first criterion is that every valid zero-substitution pattern is immediately preceded by a "one" bit (pulse). Thus, when a zero substitution pattern is identified to be immediately preceded by a "1," it is determined to be a true zero substitution pattern. It should be noted, however, that the immediately preceding one bit may be a part of a preceding zero substitution pattern rather than a "signal" one bit.

The second criterion is that successive zero-substitution BPVs will be of opposite polarity. Thus, the string is examined to detect the specific occurrences of successive same-polarity BPVs. Such an occurrence would signify a zero-substitution pattern that has been corrupted by a random isolated bit error, and the string could be reconstructed.

BRIEF DESCRIPTION OF THE DRAWINGS

FIGS. 1a–1d are examples of B3ZS signals and of corrupted B3ZS signals, which an enhanced B3ZS decoder according to the present invention is capable of identifying.

DESCRIPTION OF THE PREFERRED EMBODIMENT

Figure 2:
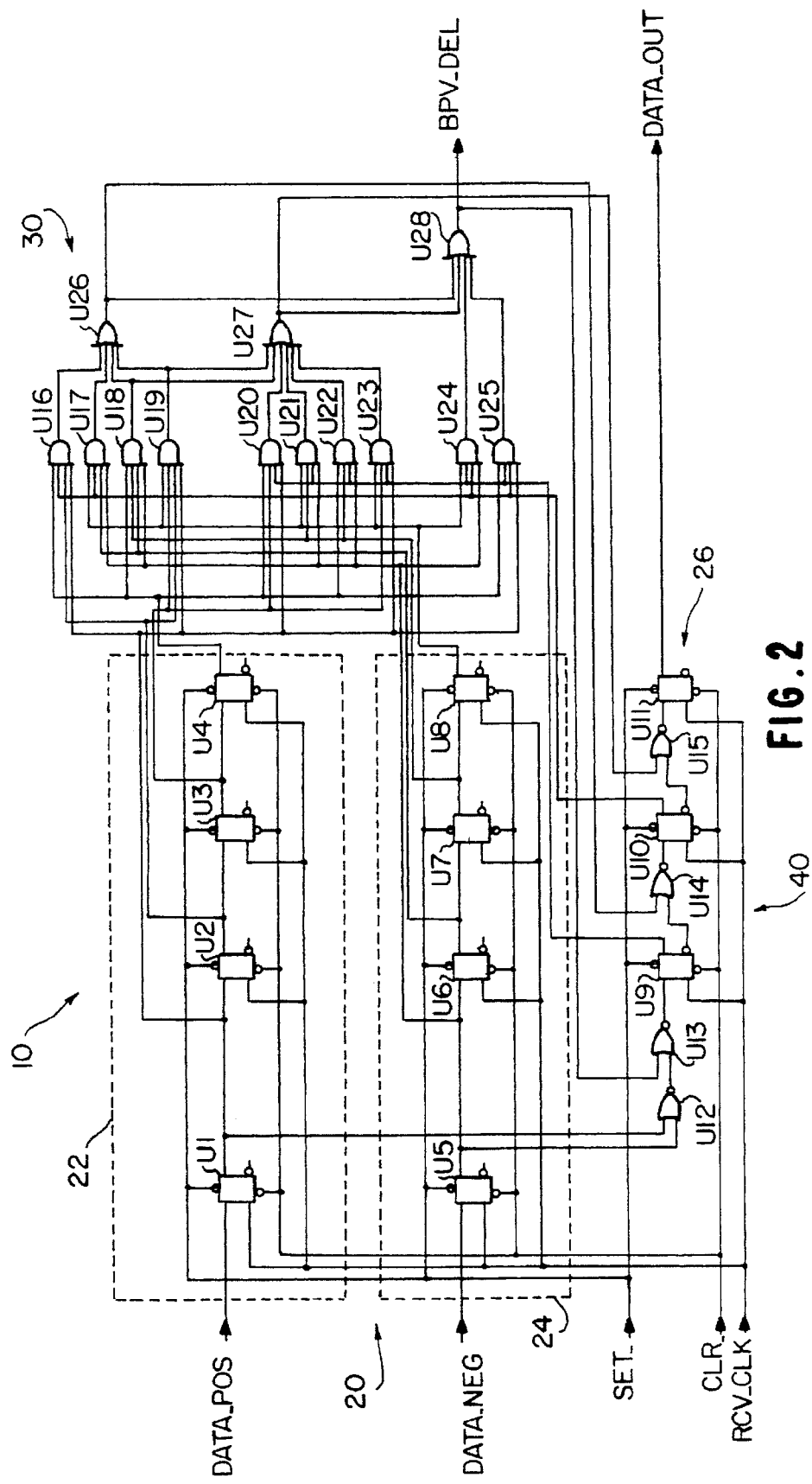
FIG. 2 is a circuit diagram of an enhanced B3ZS decoder according to an embodiment of the present invention.

A system for recovering a digital data stream from a bipolar B3ZS encoded signal generally comprises two main parts. A bipolar-to-unipolar and clock recovery circuit receives the bipolar B3ZS signal as an input, and outputs a positive data rail, a negative data rail, and an extracted clock signal as digital signals. The positive and negative data rails and the extracted clock are input to a B3ZS decoder, which resubstitutes appropriate strings of zeros and outputs recovered Non-return to Zero (NRZ) data.

The enhanced B3ZS decoder of the present invention uses the multiple criteria described above to identify the true zero-substitution patterns, while ignoring certain false zero-substitution patterns caused by random channel errors. In addition, the enhanced B3ZS decoder of the present invention uses these criteria to identify corrupted zero-substitution patterns. When these criteria are met, the appropriate bits are set to zero, effectively replacing the identified pattern with the original three-zero pattern.

In a particular embodiment of the present invention, four sequential bits are examined to include both the zero-substitution pattern and the required preceding "one" symbol. If both requirements are satisfied, it may be determined that a valid zero-substitution pattern has been detected. Another particular feature of the present invention relates to comparing successive BPVs for opposite polarity. In order to preserve the DC balance characteristics of the bipolar code, subsequent substituted words must also be DC balanced. Thus, successive substituted BPVs are of opposite polarity. For example, an unencoded 10001000 may be coded as either 1001-100-1 or 1-10-11001, the first substitution being a 100V100V and the second being a 1B0V100V. When a violation of this property is detected, it may be concluded that a valid zero-substitution pattern has been corrupted by random isolated bit errors.

The zero-substitution patterns that are identified by the enhanced B3ZS according to the present invention are as follows:

| Found Pattern | Action | Explanation |
| --- | --- | --- |
| 100V | xxx0 | A valid 00V substitution pattern |
| 1B0V | x0x0 | A valid B0V substitution pattern |
| 1V0V | x0x0 | A corrupted 00V |
| 1BVV | x000 | A corrupted B0V |
| 10VV | xx00 | A corrupted B0V0 or 100V |

Where:

1=Any "one" symbol (+or–);

B=A "one" symbol of opposite polarity as the previous "one" symbol;

V=A "one" symbol of the same polarity as the previous "one" symbol;

0=A "zero" symbol; and x=No action taken on this bit.

FIGS. 1a–1d provide graphical representation of the identifiable patterns listed in the first four rows of the above table. For example, FIGS. 1a and 1b show an uncorrupted 100V and 1B0V, respectively. That is, in both 1a and 1b, the transmitted pattern is received as transmitted. On the other hand, examples of corrupted substitutions are shown in FIGS. 1c and 1d. In FIG. 1c, a string of three zeros was replaced by a 00V pattern. However, through random error in the line, a bit referenced by numeral 1 has been changed to a logical one, thereby changing the received pattern to a V0V. Since this pattern introduces two BPVs of the same polarity, an enhanced B3ZS decoder according to the present invention would recognize this pattern to be a corrupted valid substitution. Similarly, FIG. 1d shows an example of a corrupted B0V substitution. In the example shown in FIG. 1d, the bit referenced by numeral 2 has been changed by random error from zero to negative one. Again, such an error introduces two successive BPV of the same polarity. Thus, an enhanced B3ZS according to the present invention would identify such a pattern as being a corrupted substitution. The fifth row of Table 1 shows two possible variations on the above examples.

One particular example of an enhanced decoder according to the present invention is shown in FIG. 2. With reference to FIG. 2, the enhanced B3ZS decoder circuit 10 of this example consists of three distinct linear shift registers used as memory circuit 20 (U1–U11), pattern recognition circuit 30 (U16–U28), and zero-resubstitution circuit 40 (U13–U15). The memory circuit 20 includes a positive and a negative data rail shift registers 22 and 24 (U1–U4 and U5–U8 respectively) which keep the values of the last four bits of the positive data rail and the negative data rail, respectively, received from the U/B circuit (not shown). The memory circuit 20 also includes linear shift register 26 (U9–U11) which keeps the logical "OR" value of the last three positive and negative data rail values.

While the positive and negative data rail shift registers 22 and 24 keep polarity information of the received "one" symbols, polarity information is lost in the shift register 26. In the enhanced B3ZS decoder of this embodiment, identification and resubstitution functions are separated. Consequently, the values of the positive and negative data rail registers 22 and 24 are not effected by substitution instructions, an advantage required for the implementation of the full set of identification criteria. To demonstrate this feature, assume that a pattern of six consecutive zeros, 000000, is to be transmitted. Assume, in addition, that the pattern was coded according to 00VB0V and transmitted as 001-10-1. Ordinarily, after identifying the 001 to be a 00V substitution pattern, the positive one bit will be set to zero to provide the resubstitution of three consecutive zeros. However, if the resubstitution function is not separated from the identification function —as is done by the enhanced B3ZS of the present invention —the decoder will not be able to recognize satisfaction of the first criterion. That is, if the positive one bit of the 00V is resubstituted to zero, the next zero substitution pattern B0V will no longer be preceded by a one bit. The enhanced B3ZS decoder of the present invention avoids this problem by using the shift register 26 to perform the resubstitution, thereby ensuring that the positive and negative data rail shift registers 22 and 24 retain the information of the received substitution pattern.

In the example of FIG. 2, NOR gate U12 is used to provide an indication of the logical value of the first bit. Specifically, in this particular example, when the first bit of either the positive or the negative data rail is of logical "one", NOR gate U12 outputs a logical "zero" into NOR gate U13. A particular example of the use of NOR gate U12 is given below in connection with an explanation regarding the function of NOR gates U13–U15.

The pattern recognition circuit 30 (U16–U28) decodes the shift register element values into substitution instructions for the zero-resubstitution circuitry (U13–U15). The AND gates U16–U25 are used to identify individual patterns, while the three OR gates U26–U28 are used to identify a valid substitution pattern upon which a resubstitution action will be taken. When any of OR gates U26–U28 identify a valid substitution pattern, it outputs a logical "1". In this particular preferred embodiment, the number of AND gates required to identify all the possible patterns is reduced by advantageously using the outputs of flip-flops U9 and U10. However, it will be understood by those skilled in the art that other configurations can be used to identify the possible patterns.

In the example of FIG. 2, when a valid substitution has been identified and a logical "1" output by any of OR gates U26–U28, the output of NOR gates U13–U15 is forced to zero, thereby resubstituting the appropriate logical zeros for the valid B3ZS pattern. An example of this process will be given with respect to NOR gate U13. When OR gate U28 identifies a valid substitution, it sends a 1 to NOR gate U13 and forces U13 to output a zero. This zero would be resubstituted for the second bit, regardless of the output of U12. However, if the output of U28 is zero, the output of U12 passes through U13 inverted and is output by flip-flop U9. Thus, NOR gate U13 either forces a zero output or passes an inverted signal from NOR gate U12. Similarly, NOR gate U14 either forces a zero or passes an inverted signal received from flip-flop U9, and NOR gate U15 either forces a zero or passes an inverted signal received from flip-flop U10.

As explained above, the use of alternating polarity coding allows for in-service performance monitoring. Thus, generally a counter is provided which counts the number of BPVs to provide an indication of the integrity of the line. However, in B3ZS coding, any string of three zeros is replaced with a word containing a BPV. Thus, the above-mentioned counter may provide an erroneous indication of low integrity when encountering the B3ZS substitution patterns. To avoid this difficulty, the enhanced B3ZS decoder of FIG. 2 provides an indication whenever a valid substitution pattern has been identified, so that the associated violation will not be counted as a random error. In the particular example of FIG. 2, this is done by using the output of OR gate U28, labeled BPV-DEL.

While the invention has been described with reference to specific embodiments thereof, it will be appreciated by those skilled in the art that numerous variations, modifications, and embodiments are possible, and accordingly, all such variations, modifications, and embodiments ar to be regarded as being within the spirit and scope of the invention.

I claim:

1. A method for decoding a B3ZS signal and detecting corrupted B3ZS substitutions therein, said method comprising:

examining a pulse train of four bits;

determining whether the first bit of said pulse train is a logic one bit;

detecting whether said pulse train includes multiple BPVs; and determining that said pulse train includes a corrupted B3ZS substitution when successive ones of said multiple BPVs are of same polarity and said first bit is of logical one.

2. The method according to claim 1, further comprising the steps of:

detecting whether said pulse train includes a single BPV; and, determining that said pulse train includes a valid B3ZS substitution pattern when said first bit is of logic zero and said pulse train include only a single BPV.

3. The method according to claim 2, further comprising replacing each non-zero bit of said corrupted B3ZS substitution with a zero bit.

4. The method according to claim 1, further comprising the steps of:

separating the received pulse train into a positive rail and a negative rail; and, applying said negative and positive rails to a positive and a negative four-bit shift registers, respectively, prior to said examining step.

5. A method for detecting a random bit error in a B3ZS coded signal, comprising:

receiving a four-bit word of a pulse train signal;

determining that said four bit word includes a B3ZS substitution when said four-bit word includes at least one BPV and the first bit of said four-bit word is of a logic one; and, determining that said B3ZS substitution is corrupted when one of a second and third bit of said four-bit word is a BPV.

6. A method for detecting a random bit error in a B3ZS coded signal, comprising:

receiving a four-bit word of a pulse train signal;

determining that said B3ZS substitution when a first bit of said word is a logical one bit, a fourth bit of said word is a BPV, and one of a second and third bit of said four bit word is a BPV.

7. The method according to claim 6, further comprising the step of:

determining that said four bit word includes a B3ZS substitution when said four-bit word includes at least one BPV and the first bit of said four-bit word is of a logic one.

8. A B3ZS decoder capable of recognizing corrupted B3ZS substitution, said decoder comprising:

a first register means for registering a four-bit word of a received pulse train signal;

a first detecting means for detecting whether a first bit of said four-bit word is a logic one;

a second detecting means for detecting logic level of a second and third bit of said four-bit word;

determining means for determining that said four-bit word includes a corrupted zero substitution when said first detecting means detects that said first bit is a logic one and said second detecting means detects that one of said second and third bit is a BPV; and, a second register means for replacing BPV bits of said four bit word with zeros.

9. The B3ZS decoder of claim 8, wherein said first register means comprises a first linear array shift register for receiving a positive train of said pulse train signal, and a second linear array shift register for receiving a negative train of said pulse train signal.

10. The B3ZS decoder of claim 9, wherein said first detecting means comprises a logic device.

11. A B3ZS decoder capable of recognizing corrupted B3ZS substitution in a four-bit word, said decoder comprising:

a positive data rail shift register for a registering four bits of a positive data rail;

a negative data rail shift register for a registering four bits of a negative data rail;

a pattern recognition circuit for decoding signals received from said positive and negative data rail shift registers;

a zero substitution circuit responsive to said pattern recognition circuit for substituting zeros for the zero substitution bits; and wherein said zero substitution circuit does not effect said positive and negative data rails, so that said four bits of said positive and negative data rails are not changed when said zero substitution circuit substitutes zeros for the zero substitution bits.

12. The B3ZS decoder of claim 11, wherein said pattern recognition circuit determining that said four-bit word includes a corrupted zero substitution when a first bit of each of said positive and negative data rail shift registers is a logic one bit and said positive and negative data rail shift registers include two BPVs which are of same logic sense.

* * * * *